US007643354B2

(12) United States Patent
Landfield et al.

(10) Patent No.: US 7,643,354 B2
(45) Date of Patent: Jan. 5, 2010

(54) NEURAL NETWORK MODEL FOR INSTRUMENTS THAT STORE AND RETRIEVE SEQUENTIAL INFORMATION

(75) Inventors: Philip W. Landfield, Lexington, KY (US); Olivier Thibault, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 1603 days.

(21) Appl. No.: 09/986,290

(22) Filed: Nov. 8, 2001

(65) Prior Publication Data

US 2002/0066457 A1 Jun. 6, 2002

Related U.S. Application Data

(63) Continuation-in-part of application No. 09/628,556, filed on Jul. 28, 2000, now Pat. No. 6,354,298.

(60) Provisional application No. 60/146,143, filed on Jul. 30, 1999, provisional application No. 60/157,859, filed on Oct. 6, 1999, provisional application No. 60/187,171, filed on Mar. 2, 2000.

(51) Int. Cl.
*G11C 7/10* (2006.01)
(52) U.S. Cl. ............................. 365/189.05; 365/189.02
(58) Field of Classification Search ................. 365/220, 365/189.05, 189.02
See application file for complete search history.

(56) References Cited

U.S. PATENT DOCUMENTS 5,535,170 A     7/1996   Imamura et al.
5,611,350 A     3/1997   John
5,644,387 A  *  7/1997   Oda et al. ................... 356/5.01
5,963,505 A  * 10/1999   Pomet et al. ........... 365/189.02
6,046,947 A  *  4/2000   Chai et al. .................... 365/201
6,052,326 A     4/2000   Kashiwakura et al.
6,061,593 A     5/2000   Fischell et al.
6,066,163 A     5/2000   John
6,109,269 A     8/2000   Rise et al.
6,354,298 B1    3/2002   Landfield et al.
6,845,436 B1 *  1/2005   Wu ............................. 711/167

OTHER PUBLICATIONS

György Buzsáki et al., "Temporal structure in spatially organized neuronal ensembles: a role for interneuronal networks", Current Biology Ltd., ISSN, pp. 504-510.
Dennis Gabor, "Science, Holograph, 1948-1971", vol. 177, No. 4046, Jul. 28, 1972, pp. 299-313.

(Continued)

*Primary Examiner*—Amir Zarabian
*Assistant Examiner*—Kretelia Graham
(74) *Attorney, Agent, or Firm*—McDermott Will & Emery LLP

(57) ABSTRACT

A method and design is provided for distributing and storing sets of temporally ordered information in a systematic and sequential fashion. This method is based on a model of how the brain functions in the distribution and storage of temporally ordered memories, but it can also be applied to the design of new biological, electronic or optical devices. These devices may be used in the testing and development of new therapeutic drugs, in the detection of toxic agents or impaired performance, or in the development of new industrial and consumer devices in which the orderly storage of sequential information is important.

16 Claims, 10 Drawing Sheets

OTHER PUBLICATIONS

Charles M. Gray et al., "Stimulus-specific neuronal oscillations in orientation columns of cat. visual cortex", Proc. Natl. Acad. Sci. USA, vol. 86, Mar. 1989, Neurobiology, pp. 1698-1702.

William B. Kristan, Jr., "He's got rhythm: single neurons signal timing on a scale of seconds", Nature Neuroscience, vol. 1, No. 8, Dec. 1998, pp. 643-645.

Philip W. Landfield et al., "Science, Theta Rhythm: A Temporal Correlate of Memory Storage Processes in the Rat", American Association for the Advancement of Science, Jan. 1972, vol. 175, pp. 87-89.

Bruce L. McNaughton, "The Neurophysiology of Reminiscence", Neurobiology of Learning and Memory 70, (1998), pp. 252-267.

Michael N. Shadlen et al., "The Variable Discharge of Cortical Neurons: Implications for Connectivity, Computation, and Information Coding", The Journal of Neuroscience, May 15, 1998, 18(10), pp. 3870-3896.

M. F. Yeckel et al., "Spatial Distribution of Potentiated Synapses in Hippocampus: Dependence on Cellular Mechanisms and Network Properties", The Journal of Neuroscience, Jan. 1, 1998, 18(1), pp. 438-450.

Philip W. Landfield, "Different Effects of Posttrial Driving or Blocking of the Theta Rhythm on Avoidance Learning in Rats", Physiology & Behavior, vol. 18, pp. 439-445.

Philip W. Landfield, "Synchronous EEG Rhythms: Their Nature and Their Possible Functions in Memory, Information Transmission and Behavior", Molecular and Functional Neurobiology, 1976, pp. 390-424.

Philip W. Landfield. "Hippocampal Neurobiological Mechanisms of Age-Related Memory Dysfunction", Neurobiology of Aging, vol. 9, pp. 571-579.

* cited by examiner

A. NORMAL

C. IMPAIRED MEMORY

B. IMPROVED MEMORY

NEURAL NETWORK MODEL FOR INSTRUMENTS THAT STORE AND RETRIEVE SEQUENTIAL INFORMATION

CONTINUING DATA

The present application is a continuation-in-part of U.S. application Ser. No. 09/628,556, filed Jul. 28, 2000 now U.S. Pat. No. 6,354,298, and claims the benefit of priority to U.S. Provisional application Nos. 60/146,143, filed Jul. 30, 1999, 60/157,859, filed Oct. 6, 1999, and 60/187,171, filed Mar. 2, 2000. The contents of these provisional applications are incorporated herein by reference in their entirety.

BACKGROUND OF THE INVENTION

1. Field of the Invention

The present invention is based primarily on a neuroholographic model of how the brain stores and retrieves memories and relates to methods deriving therefrom for storing and retrieving temporal information, and applications thereof, including electronic, optical, magnetic and neural network devices that use the method of distributing temporal information into spatially ordered arrays including methods for detecting the efficacy of drugs, toxic substances or treatments on human memory and other cognitive processes, and the use of such detection for drug treatment or development.

2. Background and Brief Description of the Related Art

The invention is based on a new model of brain mechanisms in temporal memory storage and retrieval that derives from principles of brain anatomy and studies of brain electrophysiology. This new model follows loosely from a prior model the present inventor published of neuroholographic memory functions in the brain (Landfield, 1976). However, the prior model did not address storage of sequential information sets. Therefore, the elements of the updated model that deal with distribution and storage of temporal information represent a new concept that is not inherent in the prior model. The original model (Landfield, 1976) proposed that memory traces are formed in a neuron in which excitation generated by a non-information containing synchronous EEG wave occurs at approximately the same time as excitation from information-containing impulses arriving over other inputs. The summation of excitation from the two inputs is sufficient to activate the receiving neuron to fire impulses, which then leave lasting traces (memory) in that neuron as well as activates the next neurons in the chain. Because the model relies on summation between two brain waves, and projection of modified electrical waves, this process was noted to be partly analogous to the interference pattern-holographic process of optics (Landfield, 1976).

Although, the nature of neural information is of course substantially different from the phase information carried in object-reflected light beams of holograms, it was recognized that certain common principles might apply to many forms of information, storage and retrieval based on summation of two inputs. In the new model it was also recognized that each projected wave carried a time slice of information, followed by successive waves (time slices) at periodic intervals. This creates a storage problem for the brain because storage of multiple waves in the same neurons could result in confounding and disorganization of information. However, the modified waves that transport the encoded "time-slices" of information travel over the same fibers and are presented to the same receptive neurons, making its difficult to target successive information slices to different neuron storage sites.

Many brain models for processing temporal information have been proposed, but very few deal with long term memory storage of that information. Those that do often propose the storage of sequential information in different transient oscillatory patterns in regions of the same neurons, or in different activity patterns in linked cell assemblies. However, as noted, it is highly difficult or not feasible to store temporally-tagged information in the same neurons. Thus, there is a need for discovering how the brain automatically stores and retrieves temporally sequential data, as this would suggest new architectures for memory storing devices and would allow scientists to study memory processes more accurately for development of drugs and detection of toxicity or pathology.

At present, there are massive efforts underway at many pharmaceutical firms to develop new drugs for the improvement of memory, aimed at elderly or neurologically impaired individuals, and perhaps eventually at healthy young adults as well. One of the major problems of this drug development work, however, is that there are few rapid screening methods for testing efficacy of drugs on memory. The animal models used can be controversial and the data are not always generalizable to humans; in addition, the present cellular models being developed (e.g., long-term potentiation) are even more controversial (see Russo, "The Scientist" Vol 13, March, 1999) and, in any case, do not reflect processing in complex memory systems.

The model proposed here is believed to be at least accurate, such that it can generate reality-based methods for assessing sequential memory storage based on phase shifting, intensity of summation, rates of travel of excitation, and spatial distribution of neural excitation, either in in vitro organotypic brain slices, animals examined with standard electrode or optical receptor arrays, other animal preparations or in humans. Therefore the model and its predictions could potentially generate extremely sensitive and accurate screening procedures for development of drugs that influence memory and perhaps other cognitive processes. Moreover, the method could be used by defense, medical, environmental agencies, or companies to detect or evaluate neurotoxic agents that impair memory.

Many electronic memory systems (computers) rely on random access memories, in which information sets are stored in available sites and lose sequential information (other than date codes that must be interpreted by the user). However, in random access memory semiconductor devices, spatial encoding about the memory bank used and its location on the memory device (row and column), is kept in reference with the information stored for later retrieval. This is typically accomplished by row and column decoders. On the other hand, known sequential memories systems generally utilize a "First-in-First-out" architecture based on serial transfer data, and are termed "sequential access memory." However, these designs are not optimal for long-term storage because data bits are not located in known addresses for extended periods. Thus, construction of new devices that could automatically learn, store and retrieve sequential information in a temporally ordered fashion without using complex addressing systems, therefore, might have vast utility at which we can only begin to guess. This temporal learning capacity might, for example, vastly improve computer graphics, reprogramming of devices based on experience of operation, architectural or industrial design, and self-organizing of learning and self-correcting instrument errors; numerous entertainment uses (computer games, holographic graphics, etc.) could also be envisioned.

In addition, there are intensive major efforts by defense and various research and industrial establishments to develop devices that can learn based on neural network principles. Clearly, the incorporation of a process for automatically learning and storing temporally ordered information in a readily retrievable sequential format might be a major advantage for these efforts.

SUMMARY OF THE INVENTION

The new model of this invention deals with how the brain distributes traveling informational "time slices" (waves) for storage in different, spatially-distinct neuronal arrays. The present invention stems from the realization that while it is highly difficult or not feasible to store temporally-tagged information in the same neurons, different time-linked information sets are more efficiently stored in separate spatially-distinct arrays of neurons. The new model also incorporates the anatomical structure of a brain region which is known to be critical for memory (i.e., the hippocampus) to develop the architecture of a temporal memory system. This anatomy is such that information-bearing waves or activity travel outward from cells of origin along sheets of parallel fibers, each of which fiber synapses on (connects to) many dozens to hundreds of neurons sequentially (through synapses of passage). Because of the high speed of neuronal activity travel along axon fibers, all of the receptive neurons receive the same information almost simultaneously. Therefore, in order to store one time point of information on one parallel fiber in one neuron and not others, only one neuron can be enabled for storage at a point in time. However, to store the same point in time for all the fibers, an array of neurons must be simultaneously enabled to receive information from multiple fibers. In the following pages, an "array" is defined as all memory units or pixels that are sequentially-connected (horizontally connected) or simultaneously enabled to receive multiple bits of information. In most embodiments, the units, registers, neurons or pixels of an array will be proximal spatially to each other.

In this invention of a system for temporal storage, the distribution in separate neuron arrays of temporally sequential information sets is accomplished by the timed, incremental shifting of a "reference beam of synchronized excitation," or any other means of incrementally shifting enablement, along the long axis of the parallel fibers, and or in any spatial direction(s) corresponding to temporal sequence. This shift allows the next array of neurons to be enabled just as the next set of temporal information arrives, thereby making it receptive to store that information input. A further shift of a "reference beam of excitation," or other enabling mechanism, along the spatial axis of temporal sequence enables still another array along the parallel fibers, such that the next information set is stored in only that next receptive array of neurons, and so on.

The timed, incremental shift of the "reference beam of excitation" along the direction of information travel (parallel fibers), or any direction corresponding to temporal sequences, can theoretically occur at any rate which is compatible with the rates of information transmission and storage appropriate for that system. In the brain model, however, the shift is synchronized in time such that the next sequential array is enabled (excited) by the reference wave just as the next information-containing rhythmic EEG wave ("information beam") arrives over the parallel fibers at the same array.

In the brain model, the spatial shift in "reference excitation" is accomplished by sequential delays in the activation of the interneurons that generate the EEG wave. However, for purposes of the invention, any mechanism that incrementally shifted a "process of enablement" along a spatial axis, direction or matrix corresponding to temporal sequence would be equivalent.

Similarly, whereas the mechanism of "enablement" of neural arrays in the brain model is summation of excitation in neurons, any other mechanism that selectively and simultaneously brought an array of storage elements to a responsive (enabled) state, and did so in spatially distinct arrays in a temporally incremental manner such that different arrays responded to different information sets sequentially, would be equivalent for purposes of the invention.

In the nervous system, equivalent enabling processes to the EEG rhythm mechanism proposed could, for example include rebounds from inhibition, biochemical changes at synapses, or recurrent collateral excitation, among others. In instrument devices built on these principles, equivalent processes could include electrical biases on element inputs, targeting by holographic reference beams, photonic activation, modulation of circuit switches, or mechanical switching, among many other possibilities.

These examples would be equivalent because the essential factor of the invention, whether biological, optical or electronic, is a timed, incrementally shifting state of response such that multiple spatially distinct arrays of response/storage elements become responsive in an orderly sequence that corresponds to temporal sequence of information sets. With this process, selected arrays become sequentially enabled in time and space to respond to or store selected slices of temporally ongoing information sets that pass by the arrays over time. In most embodiments all arrays will "see" the same information, but only one array will be enabled to receive any time point of the information. Also, in most embodiments, the information will be conveyed over parallel lines sequentially-connected (electrical or optical) that are functionally perpendicular to the temporally-linked arrays such that one temporally-linked array will be exposed to most parallel input lines at any point in time. Whereas, at a subsequent point in time, the same array will again be exposed to all input lines, but will not be receptive. At this second point in time, however, another array will be. Thus, this mechanism allows the sequential "capture" of different "time slices" of information from a temporally continuous flow along parallel lines and distributes them in spatially distinct arrays of elements, with each temporally-linked spatial array becoming enabled and then unenabled in temporal sequence. In addition, any recall system that involved the sequential re-activation of these arrays, with the goal of retrieving the ordered information in temporal sequence, would be a subset of this invention.

In addition, memories in the brain undergo multiple steps of processing, including indexing, distillation, symbolic associations and incorporation into other sets of associations. These different levels or steps of processing can occur sequentially in different arrays of memory units. Therefore, another variation of this invention includes any system of spatially adjacent or spatially ordered arrays of memory elements that are enabled in sequence, in a manner synchronized with the transformation or the arrival of the next level of processing of an information series. This memory storage system therefore functions not only to store in adjacent arrays the different information traces of similar levels of organization that occur sequentially in time, but in addition, functions to store in adjacent arrays the different levels of organization and processing of the same information trace as these levels develop sequentially, not necessarily in temporal sequence.

For example, an information trace is stored in the first spatial array and, in addition to being stored, undergoes an important transformation, distillation, or other form of processing, and subsequently emerges in its new form from the initial array. This second processed form of the original information series is then stored in the second array of memory units (neurons or other elements). Furthermore, the second level of trace organization is subjected to additional processing and transformation, to a third level of organization, and so on. Each new level of organization is stored in a new spatial array of memory units which was either localized adjacently or otherwise ordered along connecting elements that ensured its orderly sequential enablement for storage and later, its orderly activation for recall of that new stage of information processing.

In one aspect, the invention comprises storage and recall systems that convert temporally sequential information into a predetermined spatial organization, based on "hard-wired" connections and/or programmed properties of the units and intra-array connections. This temporal information can involve sequential but different information patterns of the same level of organization (time slices) or it can involve sequential phases of processing/transformation and different levels of organization of the same original set of information.

One embodiment of the present invention relates to a method and memory device for storing temporally sequential information in arrays of fixed memory storage units. Accordingly, the same temporally sequential information is applied to most or all of the arrays of fixed memory storage units near-simultaneously; but each array of the fixed memory storage units is successively activated in sequence such that it stores only one time slice of the continuously varying temporally sequential information.

An aspect of the method of the invention also includes recall of the different levels or phases of processing in an orderly sequential pattern of spatial activation (including forward or reverse activation), just as is recall of the temporal information (time slices) of similar levels of organization by orderly spatial activation.

In another aspect of the invention, the conversion of temporally sequential information patterns to a predetermined spatial organization of adjacent or otherwise spatially organized arrays of memory units that ensures the faithful sequential activation of the arrays, has been illustrated primarily with an example in which a beam of excitation or electrical bias, or other form of enablement, travels in the same direction of information or processing, sequentially enabling one spatially ordered array after another. However, any spatial direction that has a fixed correspondence to temporal sequence is an embodiment of the invention. In addition, neuronal arrays are usually interconnected with one another, and another form of the invention is if the activation of the first array of units was sufficient to activate the second (next) in sequence at the proper time to store the second information trace (time slice) or second level of processing, and then the activation of the second array units was sufficient to enable the 3rd array to store the 3rd (next) information set, and so on. In this variation, no extraneous incremental, synchronizing mechanism of enablement is necessary, because the sequential enablement would be governed by the pre-wired connections between the different arrays. In this variation, storage and/or processing of information in the first array would automatically enable the next (second) array in preparation for storing/processing the second (next) set or phase of information. The output connections of the first array would automatically ensure enablement of the second array in the appropriate time frame and pattern or would automatically transfer the processed set of information to the next spatial array in appropriate sequence.

Any pre-wired or pre-programmed intra-array connective system for enabling and/or activating adjacent, or functionally adjacent, spatial arrays of memory units in an orderly sequence for either storing or retrieving temporally sequential information sets such that meaningful sequential information is retained is encompassed by this invention.

These and other objects of the invention will be more fully understood from the following description of the invention, the referenced drawings attached hereto and the claims appended hereto.

DETAILED DESCRIPTION OF THE INVENTION

In holography, a highly coherent laser beam is usually split, and divided into two beams, one of which is reflected off of an object of interest ("object beam") and one of which does not contain any information about the object ("reference" beam) but is projected to overlap and interact (interfere) with the reflected object beam to form the hologram. The reflected object beam contains the information on the phase relationships among the beams that make up the object beam and are reflected from different regions of the object (Gabor, 1972). Thereafter, the hologram can be recreated by directing only the reference beam at the plate, because transmission of light at the wave maxima of the reference beam also recreates the object beam.

Figure 1:
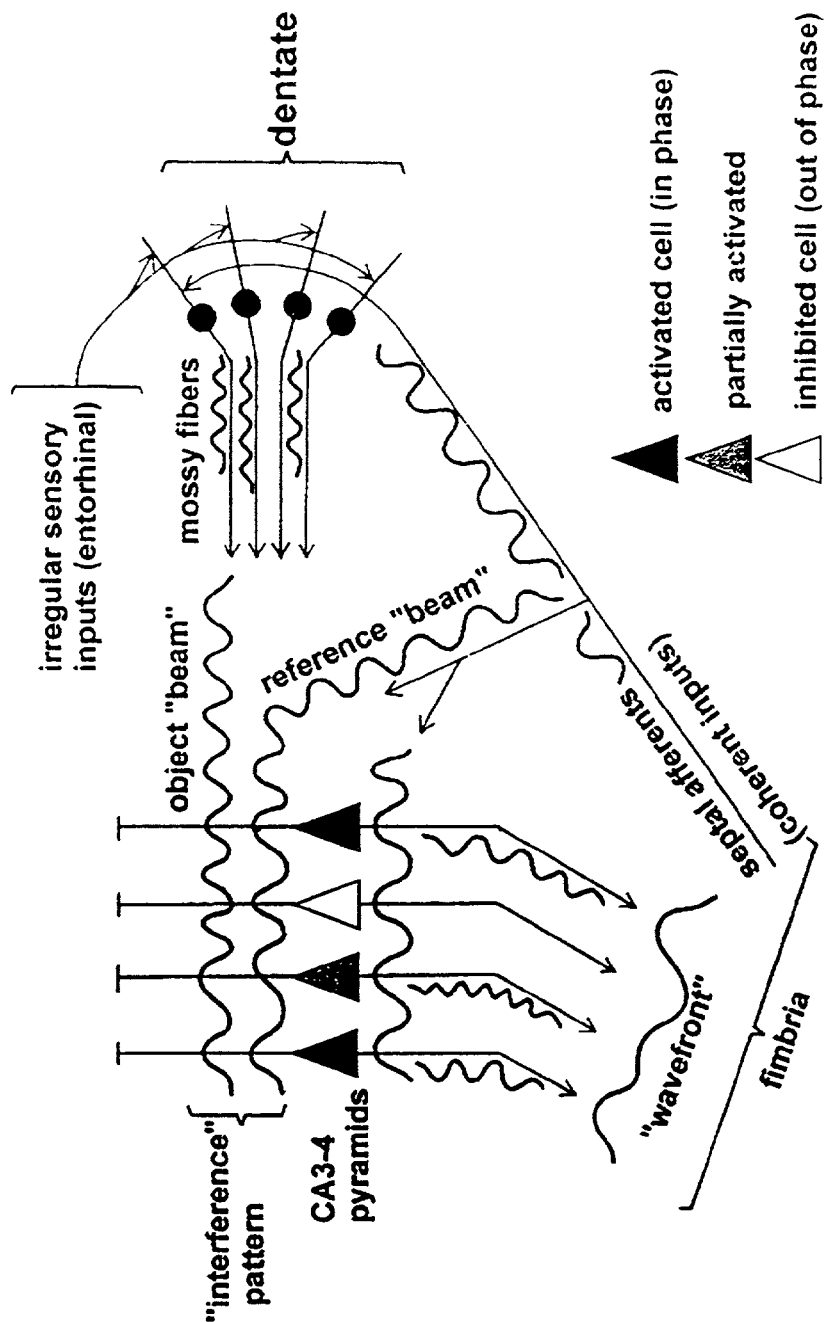
FIG. 1 depicts a hypothetical model of the manner in which the hippocampal rhythm might function in memory storage analogously to the way a laser beam (coherent wave) functions in making a hologram (see text). (From Landfield, 1976).

In the initial model (FIG. 1), the excitatory peaks of EEG theta waves were viewed as similar to the maxima of the coherent waves in holography. The theta wave maxima were proposed to interact (interfere) in specific granule cells with irregular, non-synchronized activity arriving over inputs from entorhinal cortex that encoded sensory or other information. In this way the activity encoding the information patterns in a large set of entorhinal input lines would be phase-locked to coherent temporally-spaced wavefronts being projected rhythmically out of the dentate gyrus, analogously to the "reflected object beam." The rhythmic, information-containing "object beam" waves would then interact (interfere) at subsequent relay neurons with other (non-information containing) theta waves arriving over different inputs ("reference beam"). Summation and increased excitation (e.g., "interference patterns") would occur only in those relay neurons in which the excitatory maxima of both rhythmic waves (object and reference beams) were in phase, and those neurons activated by summation patterns would form the "neurohologram".

To account for retrieval in the model, non-information containing coherent waves (e.g., the reference beam) could again preferentially find the previously formed traces and recreate (retrieve) the memory trace (Landfield, 1976).

Organization of Memory-Related Electro-Physiological Systems

Figure 2B:
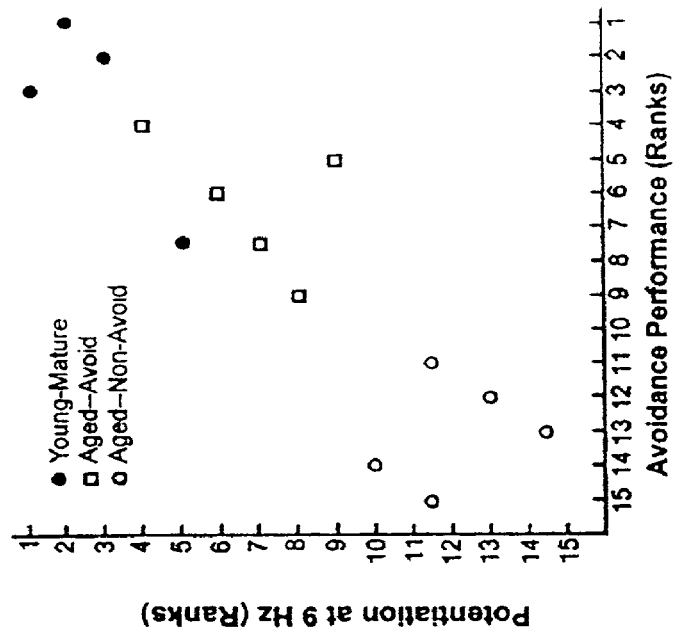
FIGS. 2A and 2B show two levels of electrophysiology-memory correlations.
Figure 2A:
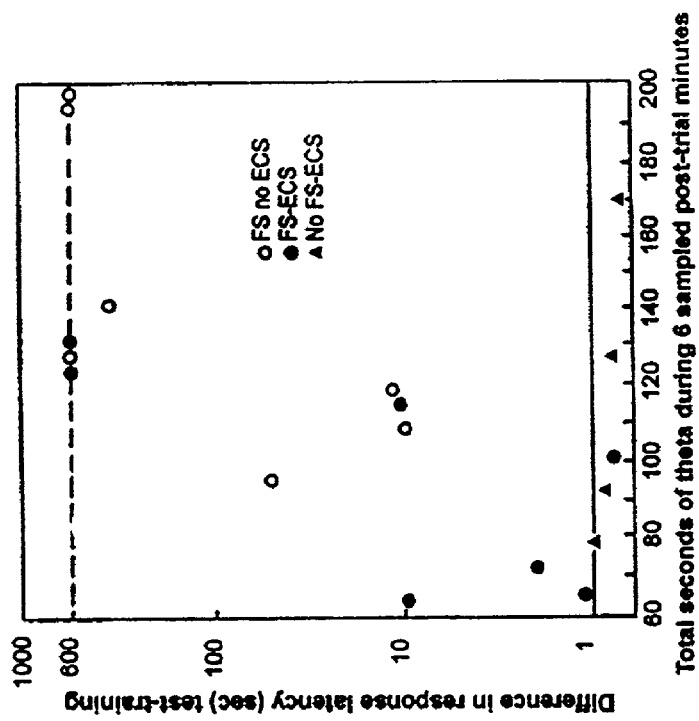

As noted above, there is evidence that the EEG-theta rhythms correlates with and perhaps directly contributes to memory consolidation (FIG. 2A). Further, other rhythmic patterns are related to memory. "Frequency Facilitation", the growth of synaptic potentials during repetitive synaptic stimulation, generally at 5-15 Hz] has been correlated with learning in aged animals.

FIG. 2A illustrates a relationship in individual subjects between amount of post-learning trial EEG theta activity and degree of subsequent retention of a 1-trial learning task 2 days after training. Elevated latency reflects good retention. FS: Footshock training; ECS: Electroconvulsive shock after training. (From Landfield, et al., 1972). ECS-treated animals show reduced theta and reduced subsequent recall of the FS training.

FIG. 2B illustrates exemplary correlation data for individual aged and young animals for which both behavioral (avoidance learning) and neurophysiological frequency facilitation data were available (Spearman rank correlation; $r_s=+0.85$). Good performance on the active avoidance (lowest numbers) is reflected by low latencies. Aged animals that were able to learn to avoid in this task exhibited stronger facilitation, which was more similar to that in young rats (From Landfield, 1988).

Figure 3:
FIGS. 3A and 3B show two levels of electrophysiological patterns in the rat, corresponding to the correlates of learning and memory shown in FIGS. 2A and 2B.

FIG. 3A depicts hippocampally-generated theta rhythms driven by 7.7 Hz electrical stimulation of the medial sepum (slight curvature reflects EEG pen movements). Note the highly rhythmic and coherent theta waves activated by 7.7 Hz (from Landfield, 1977).

FIG. 3B illustrates a frequency facilitation in a hippocampal slice CA1 pyramidal neuron during 7 Hz synaptic stimulation (of the parallel Schaffer collaterals). Note large frequency facilitation of the EPSP above the first baseline EPSP, and the bursts of multiple action potentials (spikes) on the EPSP peaks. Facilitation of the EPSP occurs in the same stimulation frequency range as theta rhythms. Calibration bar applies to A and B (150 msec).

The apparent similarities of correlation across different levels of electrophysiological organization indicated that these multi-level electrophysiological processes are hierarchically linked in an integrated system that functions in signal intensification and deposition and is both critical to learning/memory and highly vulnerable to aging.

In terms of implications for a model of memory, not only would the theta rhythm provide a coherent frequency of processing that favors the periodic formation of large-scale, organized interference patterns, but the underlying facilitation mechanism at theta frequencies ensures signal intensification in the activated neurons and, therefore, more intense summation as well as greater throughput and polysynaptic impact (e.g., Yeckel and Berger, 1998)

Extension of the Neuroholographic Model to Temporal Memory Storage

The Problem of Encoding and Storage of Sequential Information. The problem of how time and sequence are encoded in the brain of course involves many highly complex issues that have been addressed in several models (e.g., Gray and Singer, 1989; Churchland and Sejnowski, 1992; Buzsaki and Chrobak, 1995; Kristan, 1998; McNaughton, 1998; Shadlen and Newsome, 1998). However, the related problem of how sequential information is saved in long-term storage may be even more complex. The prevention of overlap and confounding among continuously arriving, differentially time-tagged information patterns represents a formidable problem with which the CNS must cope.

In the model, the distribution of sequential time-tagged patterns occurs sequentially into spatially ordered and relatively adjacent arrays, and is accomplished by a combination of induced silent periods in a recently excited array and by an incrementally shifting peak phase of the theta rhythm along the transverse direction to activate the next sequentially connected array. Thus, sequential wavefronts would be stored in adjacent arrays because an incremental shift of the peak of theta along the temporal (transverse) axis would be temporally synchronized such that it would enable only the next adjacent spatial array to be activated by the next succeeding wavefront arriving over the Schaffer collaterals from the dentate. These operations are outlined below and in FIG. 4.

Figure 4:
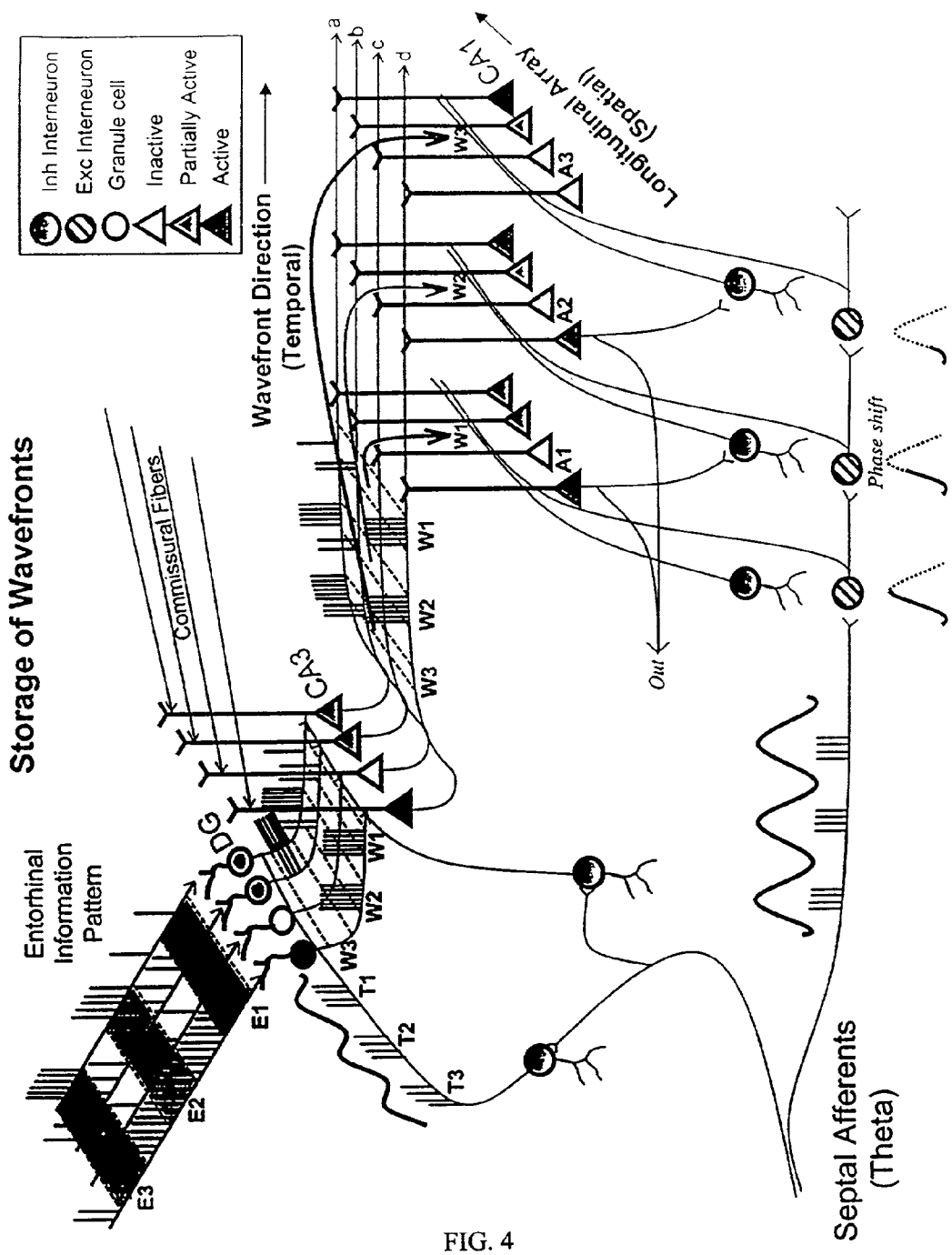
FIG. 4 depicts an updated version of the interference pattern/holographic model of memory trace formation that includes a new model of a system for storing temporally distinct information waves.

As seen in FIG. 4, highly unsynchronized information-containing activity continuously arrives from entorhinal cortex via numerous input fibers. At the dentate gyrus (DG), this information activity pattern (the "object" in the optics analogy) is temporally sampled by summation with the theta rhythm in the dentate gyrus (DG) and converted into coherent waves (theta) projected from the DG to CA3 at the theta frequency (reflected object beam). Theta bursts T1, T2, T3 moving to the DG, and the entorhinal fiber activity episodes E1, E2, E3 (shaded), represent neural activities of two inputs that will arrive at the DG granule cells in corresponding time windows (e.g., T1 with E1, T2 with E2, etc.). W1, W2 and W3 represent the encoded theta frequency wavefronts that will emerge from the DG as a consequence of the interference (summation) interactions in DG between the simultaneous inputs (i.e., W1 resulting from T1 and E1 interactions, etc.). The patterned shading of DG and CA3 neurons reflects the activity pattern generated by only the first encoded wavefront (W1). Note that each emerging wavefront will exhibit varied patterns of activity across the multiple DG output parallel fibers, which will be proportional to the relative activities of the entorhinal input fibers at the time of sampling and summation/interference in appropriate DG neurons. The emerging wavefronts only transmit quantitative information about the levels of relative activity sampled during the brief (e.g., 25-50 ms) time windows at the excitatory phases of each theta wave. In CA1, a possible mechanism for storing temporally ordered information in spatially distinct and sequential arrays is shown. As each information-containing wavefront (object beam) arrives in CA1 it will activate (and be encoded in) only the limited neural array that is simultaneously activated by the peak of the excitatory phase of the CA1 theta rhythm (reference beam). The schematic diagram illustrates the first wavefront (W1) activating and being encoded in the first neural array (A1) in which the CA1 theta excitatory phase is simultaneously maximal when W1 arrives. Subsequent arrays are not available for W1 because they have not yet reached the peak of theta activation (due possibly to synaptic delays in chains of interneurons). However, as W2 arrives in CA1, the neurons in A1 are no longer available for excitation because they are inhibited by the prior activation. Further, resetting of the theta frequency in A2 by activation of A2 inhibitory neurons by A1 pyramidal neurons ensures that the peak of theta in A2 coincides with the arrival of A2. Thus, W2 can activate A2 neurons and be encoded in A2. A similar set of conditions and additional peak phase shift induces the information patterns of W3 to most strongly activate neurons of A3. Longitudinally projecting inhibitory interneurons maintain synchrony of theta in each array, but are slightly out of phase with other inhibitory interneurons controlling more lateral arrays along the transverse axis. Note that the information dimension of the wavefront, which encodes relative activity, is envisioned to extend longitudinally in the hippocampus, whereas the time dimension (direction of wave travel) is proposed to extend in the transverse plane (along the trisynaptic circuit). Therefore, different time-slice wavefronts will be stored in different sequential arrays along the transverse plane. An array might vary in width along this plane from a few to dozens or hundreds of neurons. Along the longitudinal extent, however, many thousands or more of neurons could participate in a wavefront array.

The above schema is simplified for purposes of explanation and is non-exclusive. Other possible circuitry mechanisms could of course be conceived for ensuring that adjacent arrays are sequentially enabled simultaneously with the arrival of the next sequential information wavefront. However, the essential element of the model is the sequential enablement of succeeding arrays in an orderly spatial pattern.

Physiological Methods for Testing Effects of Agents on Temporal Memory

Based on the basic principles of the invention described herein, one schooled in the art could readily conceive of tests in animals, animal tissues or humans that would allow use of the invention to test new compounds, physiological conditions or interventions of any kind for an effect on temporal memory processes. For example, the neuroholographic model proposes that different arrays of neurons in the hippocampus will be activated in sequence by sequential waves or bursts of neural activity, and that such sequential activation corresponds to the conversion of temporally sequential information into anatomically distributed information for subsequent orderly recall.

Therefore, an experienced researcher can use known magnetic or optical imaging or electrophysiology recording methods to evaluate the spatial distribution of neural activity in an intact brain or brain slice preparation during repetitive sequential stimulation pulses of input fibers. Using an array of multiple electrodes arranged, for example, as the teeth of a rake, a 2-dimensional square matrix, or in some related arrangement, suited to monitor the transmission of neural activity through the known anatomy of a specific brain structure, the researcher could record the neural activity simultaneously at all the electrodes, store these data, and then assess the sequence and pattern of activity at each electrode. The neuroholographic model predicts that during repetitive activation of the underlying neurons (whether by spontaneously generated activity or experimentally-induced activation), greater neural activity should be generated at one (or one subset) of the array of electrodes, in comparison to the other electrodes, by the first stimulus pulse or pulses. Subsequent pulses, however, should generate greater neural activity at a different subset of electrodes, in an orderly manner. And pulses after that should generate the greatest activity at still another subset of electrodes. The pattern of shifting foci of activity with subsequent bursts, is consistent and measurable, and therefore, a researcher would readily be able to determine whether any experimental intervention, condition or disease impaired or enhanced the sequence rate, amplitude or distribution of the activity patterns as they reached each of the various electrodes.

Figure 5:
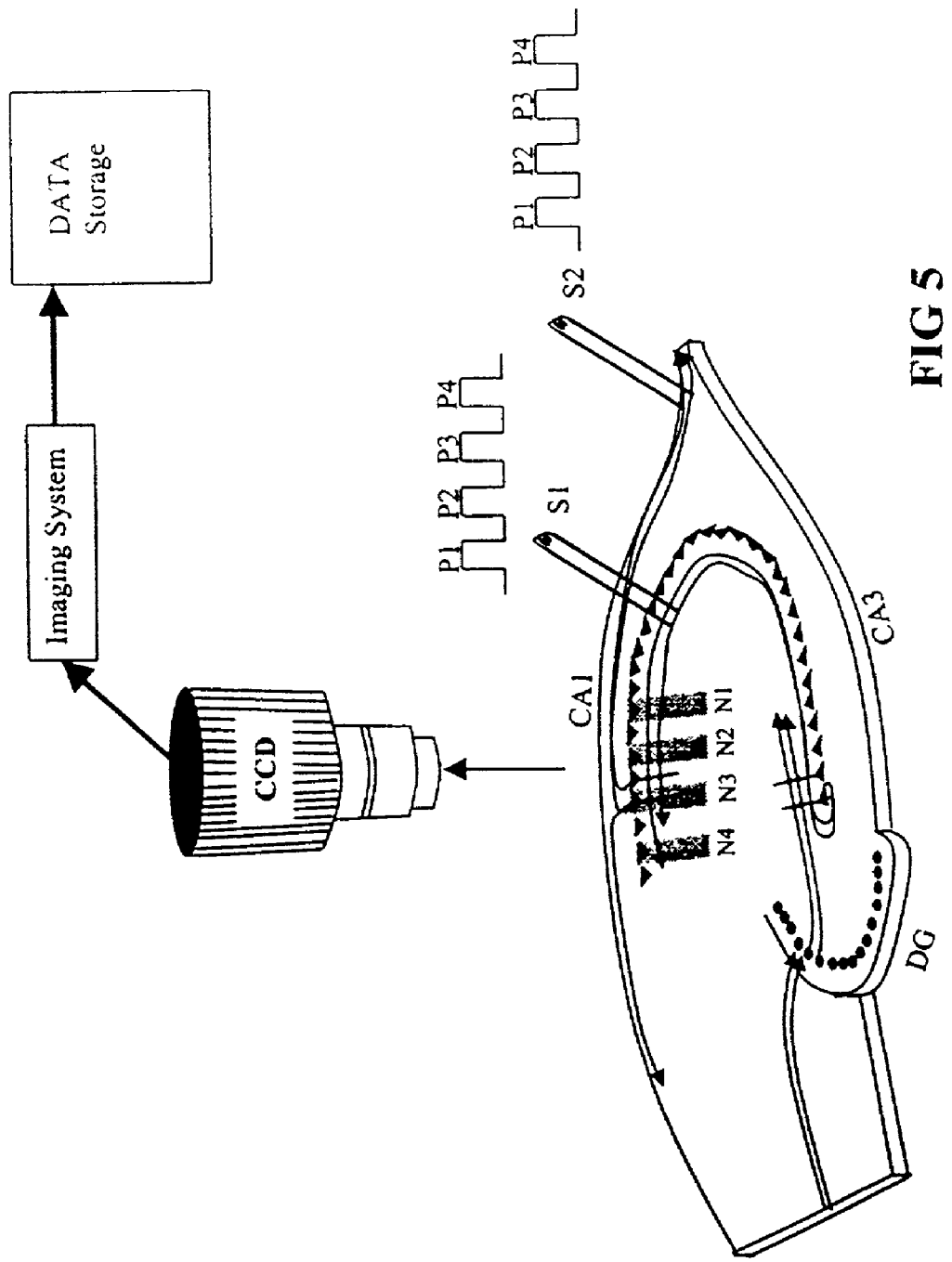
FIG. 5 depict a brain slice preparation in which optical imaging methods can be used to measure and assess sequential memory processing.
Figure 6B:
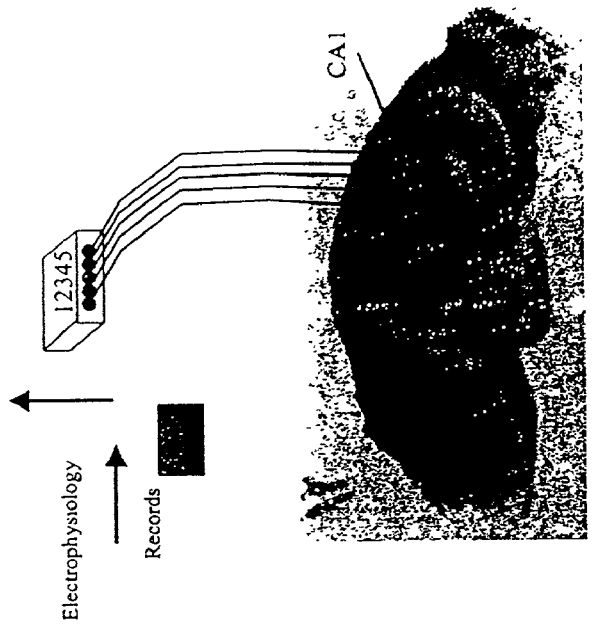
FIG. 6 is a schematic illustration of how a "rake" of multiple electrodes could be oriented along the transverse axis of the hippocampus, to monitor sequential activity traveling transversely along the Schaffer collateral fibers.
Figure 6A:
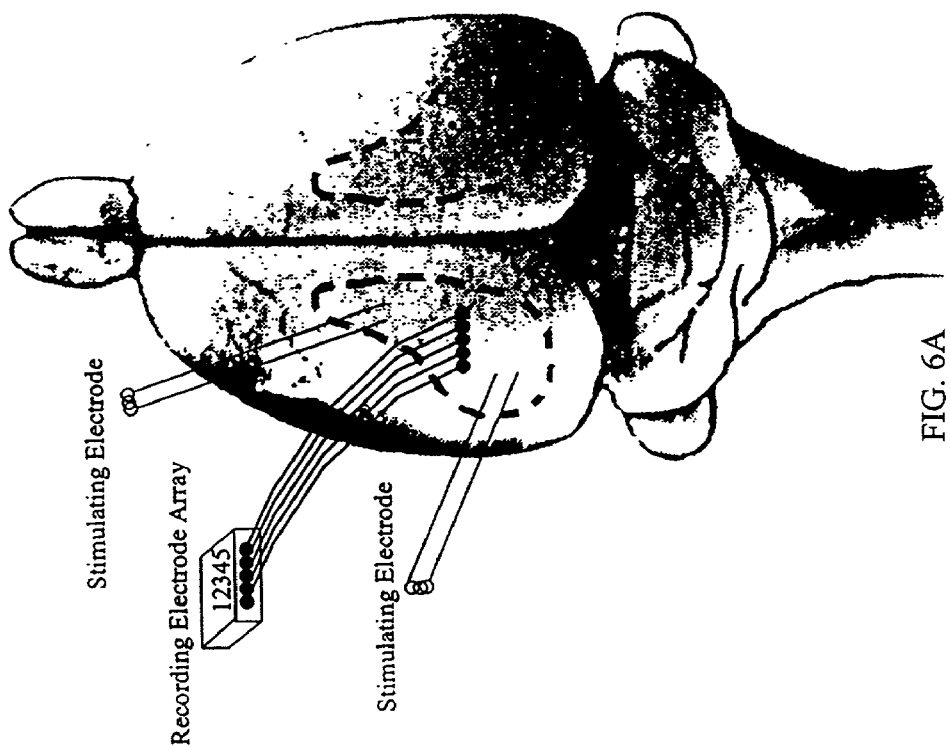

FIG. 5 shows an example of optical imaging of a fluorescent calcium dye in a slice preparation, during repetitive stimulation of input fibers (e.g., Schaffer Collaterals) through a stimulator(s) connected to a pulse generator. With each sequential pulse ($P_1$-$P_4$) a spatially distinct portion of the brain slice ($N_1$-$N_4$) shows enhanced calcium fluorescence indicating great neural activity. The consistency of the foci shift on repeated applications of 4 pulses reflects the fidelity and strength of sequential memory storage. In another example, (FIG. 6) a researcher studies an animal that has a "rake" array of 5 microelectrodes implanted in the hippocampus, with the rake oriented longitudinally along the hippocampal transverse axis. Each electrode is connected to an isolated wire that goes to a connector unit cemented to the animal's skull (FIG. 6A), as shown on the top view of the rat brain, with the hippocampus outlined beneath the brain surface. A rake of 5 recording electrodes is shown implanted in the hippocampus. On either side, stimulating electrodes are also implanted, which are able to stimulate input fibers to the hippocampal neurons that are recorded by the rake recording electrodes. FIG. 6B shows a transverse hippocampal brain slice dissected from the hippocampus of a rat maintained in an oxygenated chamber. A multi-electrode rake with 5 electrodes is oriented along the transverse axis (e.g., from left to right). A stimulating electrode (not shown) can then be lowered onto fiber bands originating from the entorhinal cortex (left) or the dentate gyrus (lower right) to stimulate fibers projecting to the CA1 region neurons being recorded from by the multi-electrode rake. These assemblies are well known in neuroscience research. The researcher then induces repetitive bursts of activity (e.g., of 4-15 Hz) in the animal's hippocampus, either with a stimulating electrode located on fibers of a hippocampal input pathway, or by arousing the animal and thereby inducing spontaneous rhythmic activity. The researcher then records and stores in a computer the activity pattern at all five electrodes during the first burst, the second burst, the third burst, and so on (FIG. 7). The researcher then quantifies the profile of activity at all five electrodes during each sequential burst, and notes where the peak activity was on each burst, how intense and large the amplitude of the activity pattern was, how rapidly it traveled and/or decayed between the different electrodes, and whether it reflected an orderly sequential pattern during multiple tests (along with other measures).

The researcher then gives an experimental drug to the animal that may improve memory and runs the same experiment again. Now the researcher observes that the sequence of activity is similar, but there is a larger burst of activity at each electrode in sequence, and there is less extraneous activity (i.e., greater contrast between electrodes).

Figure 7A:
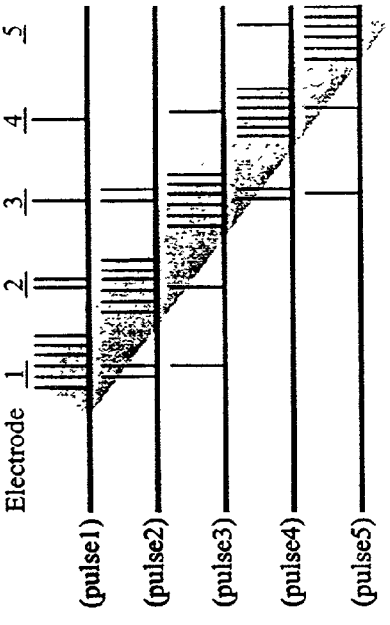
FIGS. 7A, 7B, and 7C are schematic diagrams illustrating the kinds of recordings that are obtained in the examples from the 5 electrodes shown in FIG. 6, during a series of five repetitive stimulation pulses from one of the stimulation electrodes.
Figure 7C:
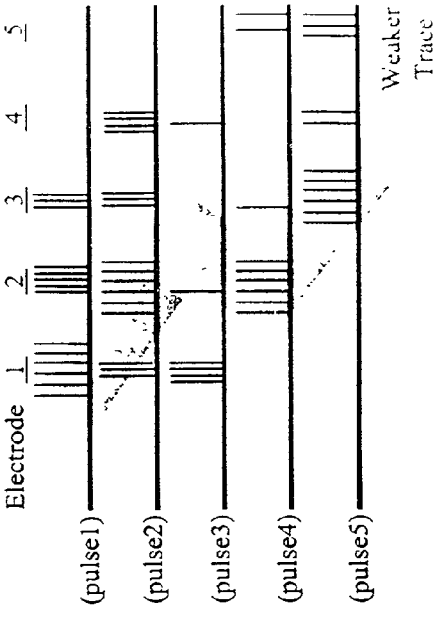
Figure 7B:
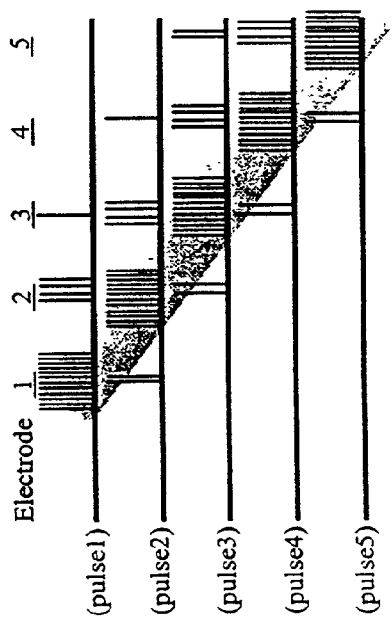

Then, the researcher waits for the animal to recover and gives it a dose of pesticide that is thought to have toxic neural effects. The researcher performs the same experiment and observes that now, the peak activity at each electrode is diminished, the activity peak at one or one set of electrodes occurs in a different sequence than it did before, and there is not as large a difference between the electrodes during each burst as there was before the pesticide was given. Moreover, on repeated tests of five pulses each, the sequence is less consistent than under control conditions. FIG. 7A shows the normal patterns of neuron activity (action potential spikes) that would be recorded at each electrode on pulse 1 and on the subsequent 4 pulses. The peak activity focus shifts along the hippocampal transverse axis with each succeeding pulse. FIG. 7B depicts a stronger pattern seen during treatment with a drug that improves temporal memory. FIG. 7C depicts a weaker, more disorganized, and sequentially disrupted pattern seen during exposure to a toxic agent that impairs memory.

The researcher concludes that the first drug should improve temporal memory in animals because it enhanced the normal properties of the shifting activity focus system, e.g., by enhancing the intensity of bursts and the distinction between different electrodes, or increasing the rate of activity travel through the electrode array and enhancing sequence consistency. The researcher therefore proceeds to test the drug in animal behavioral tests to determine whether it enhances learning and memory in animal models, with the goal of eventually developing a new drug for beneficial use in humans.

On the other hand, the researcher also concludes that the pesticide may have pathological actions on human temporal memory and cognition because it disrupts the normally orderly sequential patterns, adds inconsistency, reduces the distinction between activity bursts at various electrodes and/or reduces the intensity of each burst. Therefore, the pesticide is recommended for an extensive series of behavioral tests to identify its toxic consequences.

The invention is therefore very useful because it allows for rapid screening of compounds or other treatments without cumbersome and prolonged behavioral testing. It also has utility over other recording methods because it relies on predictable sequential patterns at multiple electrodes, and is therefore able to detect very subtle differences. The difference between this and other recording tests that use multiple electrodes, is that here the relationship between activity at each electrode shifts in a consistent fashion with each subsequent pulse or set of pulses dependent on anatomical organization and synchronization/timing mechanisms. Therefore, the new method of this invention tests a specific cognitive function and capacities that are critical to human memory: the ability to store temporal patterns that vary over the period of a few seconds (e.g., the multiple syllables of a long word, recall of the sequential visual pattern associated with a rapid active event, such as a sports play, an accident, or the direction in which a vehicle turned). Thus, the described testing system based on the invention would be uniquely specialized to test brain functions that are essential to discrete, complex, sequential memories, as opposed to simpler, more ingrained functions (e.g., recall of one's name). It is known that complex, specific-event memories are those most vulnerable to memory impairment from Alzheimer's disease, many forms of brain damage, aging, etc. Therefore, being able to screen specifically for actions of drugs or other treatments on those types of memories would be of substantial importance in developing new therapies or detecting toxic agents.

Although rapid sequences (e.g., seconds) and multiple electrode test systems are preferred examples, longer and slower sequences (minutes to hours) may reflect the "stringing" together of multiple smaller sequences using similar principles, and would be a variation of the invention. Also, tests based on the principles of this system that used sequential patterns at a single electrode or anatomical site could also readily be envisioned from the invention.

Behavioral Testing for Temporal Memory

Electrophysiological or other forms of physiological monitoring can be used effectively to screen large numbers of compounds. However, another preferred use of the invention would be to more accurately and efficiently test animals or humans in behavioral tests of memory, using tasks that require the ability to remember and recognize a temporal sequence of events, for example, a string of sound patterns (new syllables) or a series of visual patterns. The ability to recall a rapid sequence accurately would selectively test the same system of temporal sequential memory as the physiological tests noted above. Therefore, such behavioral tests could be used in conjunction with the physiological tests or alone, to probe effects of treatments on complex, sequential memory capacity.

In one example, a researcher trains a rat to press a lever for food only after the rat hears a specific series of 5 tones within a 1-second period. The researcher then introduces a sequence in which several of the 5 tones are at different frequencies. The rat is trained to press the lever only if it hears the precise new sequence of tones. Then, the researcher administers a compound to the rat and tests whether the compound facilitates or impairs the rat's recognition of the previously-learned tone sequences, or affects its ability to learn new tone sequences. The same training and testing principles is also applied to a series of visual stimuli (light patterns) or motor behavior sequences (learning a complex series of turns or lever presses in a short period).

Based on the principles of the model, a novel method is proposed herein for storing temporally sequential information in an array of fixed memory storage units (neurons), such that different sets of sequential information can be stored in separate sub-arrays of storage units in a spatially organized "chain-link" manner. The information could later be recreated in the same temporal sequence simply by activating the different spatial locations (sub-arrays) in the same or similar sequence in which the information was initially stored. A prime example of this method would be storage of the first temporal set of information in the first sub-array of neurons or storage units along an information pathway and the subsequent storage of the next sequential information set in the next or adjacent sub-array of neurons/storage units, followed by storage of the third set of information in the next sub-array after the second sub-array, and so on. The temporal series could then be recreated or recalled in sequence at a later time by activating the multiple storage arrays in the same predetermined sequence in which they originally received the sets of information for storage (i.e., first sub-array, second sub-array, third sub-array, etc.).

There are three main differences between this temporal memory system and prior neural network models of brain function or artificial storage systems: 1) In this present method, unlike in conventional FIFO serial sequential memory systems, information is divided by temporal sequence into "time slices" or waves of information which are each stored in a distinct and separate array (defined as a set of memory units that are enabled simultaneously), within a sequence of arrays, in an ordered fashion. The order of storage in arrays is regulated by the system's connections and the direction of information flow in the system; 2) Arrays (but not each individual unit in an array) are exposed to all information, generally presented over parallel lines, but specific arrays become available in sequence for storing each sequential information set based on a spatially moving process of "enablement" that makes distinct arrays available or accessible sequentially, such that each information-time slice can be stored only in the restricted array that is enabled in sequence; and 3) Interconnections among or spatial location of the arrays ensure that the information sequence can be recalled in the same sequence at a later date, by simply activating the initial array or a few initial arrays, because the interconnections among sub-arrays will then automatically activate the later arrays in the original direction of information travel (sequence).

Because the systematic shifting will occur in a repeatable and predictable manner based on internal circuitry and properties of the elements, sequential information patterns will be laid down in automatically retrievable spatial patterns, with reduced need for independent encoding of temporal information. Thus, a temporal sequence could be recalled (retrieved) in proper order simply by again activating the multiple sub-arrays in the same circuitry-dependent sequential pattern.

Any electronic, computer, optical, magnetic or even mechanical device that utilized the temporal storage principles of the invention as outlined above is within the scope of the present invention. For example, computers now use "random access" memory. However, if a computer were constructed to store memory in a defined spatial array pattern that corresponded in a predetermined manner to the temporal sequence in which information was received by the device, especially for purposes of facilitating the recall of that same sequence at a later time, this would be considered a preferred embodiment of the present invention.

Artificial intelligence devices, whether for entertainment, research or instrument control, or other purposes, that were designed to exhibit temporal learning, and that used the principle of converting time (sequence) of parallel data into predetermined space (spatially ordered storage arrays) are considered to fall within the scope of the present invention.

Devices that stored memories in a pattern of spatial arrays predetermined by circuitry and/or a moving focus of enablement (e.g., either an electrical bias to assist an array in reaching a threshold, a magnetic field directed only to the targeted arrays, some electronic switching mechanism making an array accessible to new information, or a reference beam of a holographic apparatus, to name only some of the possible strategies for producing a mechanism of "moving enablement" of different arrays in a patterned sequence) would have a major advantage over current memory devices because a central processor or retrieval mechanism would not be needed to read or interpret date codes in order to retrieve a temporal memory in sequential order. Instead, the memory processor could simply run through a known spatial pattern of (e.g., adjacent) arrays and recreate the original temporal sequence. An alternative version of this retrieval system would be a memory processor that only had to locate and activate the first (or first few) arrays in the sequence and then the remaining sequence of sub-arrays in the temporal memory set would automatically be activated in proper sequence, based on the internal circuitry among the sub-arrays (e.g., sub-array 1 activates sub-array 2 which activates sub-array 3, and so on).

Figure 8:
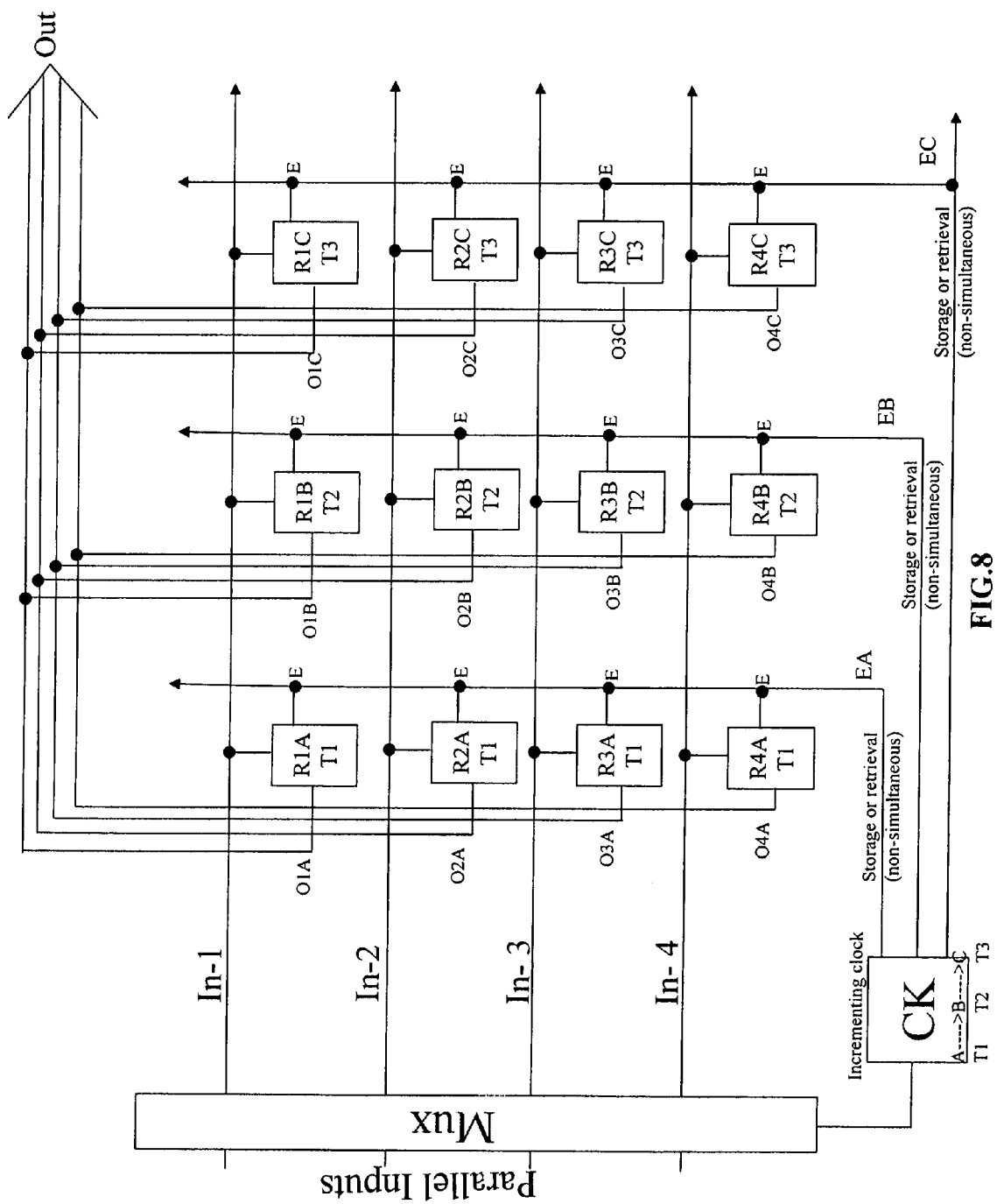
FIG. 8 depicts an embodiment of the present invention for storing temporally sequential information from parallel input lines, as implemented with semiconductor circuits.

FIG. 8 depicts an embodiment of the present invention for storing temporally sequential information as implemented with semiconductor memory circuits. Information inputs along parallel lines In-1, In-2, In-3 and In-4 are connected to memory devices R1, R2, R3, R4 in each of 3 arrays A, B, C. Information on input lines varies over time and is presented to all arrays. A clock element CK increments a positive output pulse to EA first to enable array A, then to EB to enable array B, and then to EC to enable array C, in a temporal sequence the frequency of which varies according to required processing rate. When EA receives a positive pulse, the memory devices R1A-R4A in array A are simultaneously enabled to store information available on the respective input lines In-1-In-4 at T1, the first point in time. As the subsequent pulse to EB enables R1B-R4B, the input information available at T2, the subsequent point in time, is stored in array B. Information available at T3, a third sequential time point is stored in array 3 memory devices when a pulse is then delivered to EC.

Retrieval of the information in the original sequence T1, T2 and T3 from R1-R4 in arrays A, B and C is subsequently accomplished by commanding the CLK element to send negative pulses to EA, EB and EC in the same sequence and frequency as positive pulses were delivered. The memory devices are configured to transmit the stored information over output lines O1-O4 when activated by a negative pulse. During readout, the input information lines are disabled by a multiplexer MUX. Memory devices that respond to input and output commands as well as incrementing clock elements are well known in the art.

Figure 9:
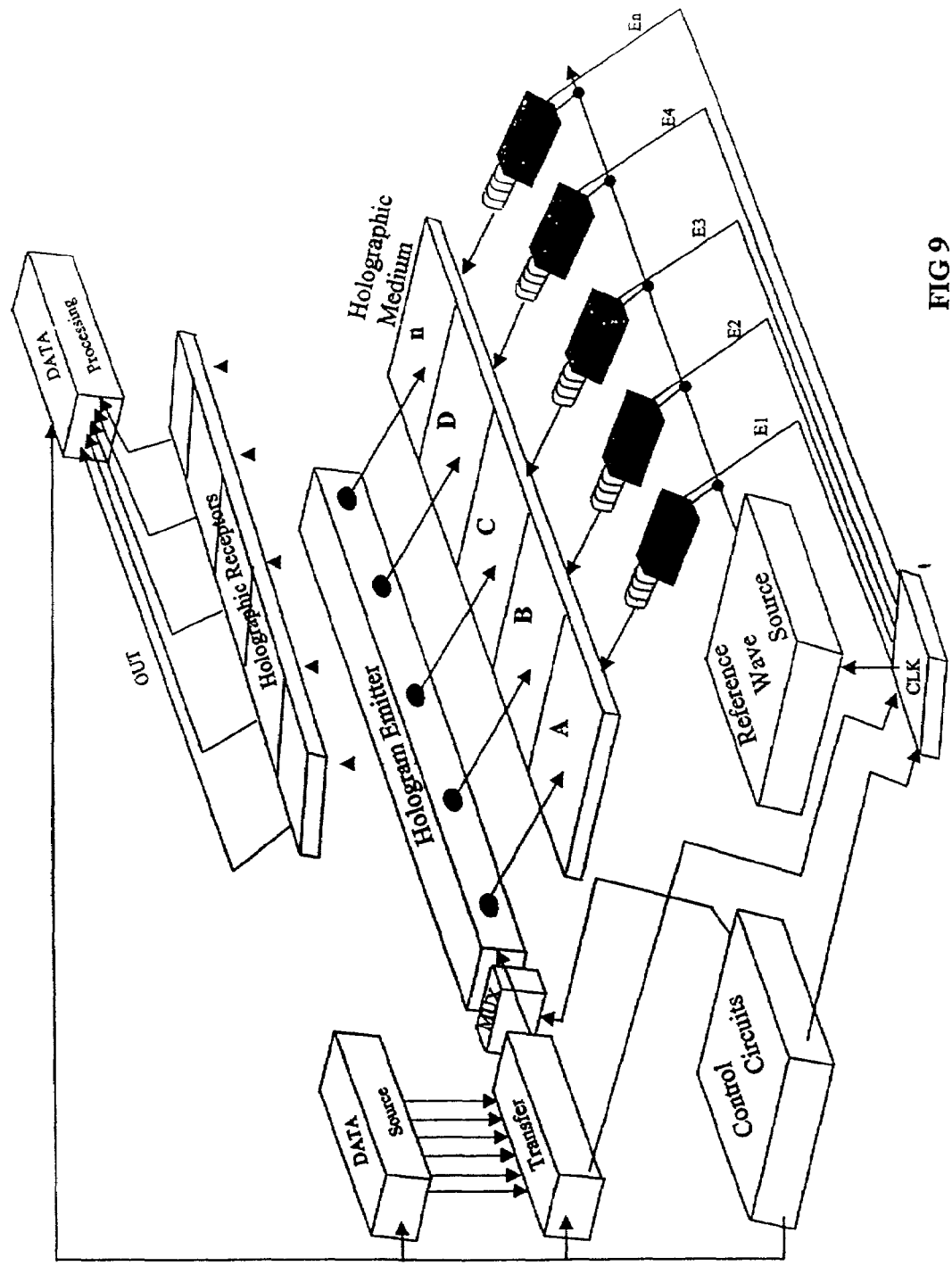
FIG. 9 illustrates an embodiment of the present invention as implemented with holography.

FIG. 9 illustrates one embodiment of the invention for a holographic storage apparatus. In the illustrated embodiment, a holographic medium is divided into separate sections, A-n, and a set of holographic emitters is arrayed on a line that allows one emitter to project a beam to one section, each section being targeted by one emitter. On another line on the opposite side of the holographic medium, a row of reference beam sources is arranged such that one reference source projects to one holographic medium section. A third line contains photoreceptor elements to receive reconstructed holographic beams, one receptor for each section. A data source projects information to a converting circuit that translates the data to a holographic image in each emitter. All holographic medium sections receive the same holographic light emission, but only one medium section is able to record the holograph at any one point in time, because only one reference source is activated at any one point in time.

A clock element CK increments output pulses over lines E1-En to enable reference sources RF1-RFn in sequence, thus storing sequential time points of temporally varying holographic data in holographic records. Playback of the data in the same sequence is automatically achieved simply by restarting the CLK and reference source sequence, without the need for address or data control by a central processor. During playback/reconstruction the holographic emitters are disenabled and the photoreceptors are activated to receive the reconstructed wavefronts.

An alternative embodiment also is one in which one holographic emitter is targeted toward all sections within a restricted portion of the medium, and the medium is curved to ensure equal light path length between the emitter and all sections. Many other variations of this basic theme can be envisioned that are well known in the art, including use of appropriately placed mirrors to direct the holographic beam, activation of only one emitter at a time (e.g., in FIG. 9) in synchrony with the enabled reference source, and physical movement of a single reference source to target different medium sections (FIG. 10B). In addition, rapid changing of the holographic media, to allow storage of extended temporal sequences is partly analogous to automatic changing of CDs, envisioned as a component of the invention.

Figure 10A:
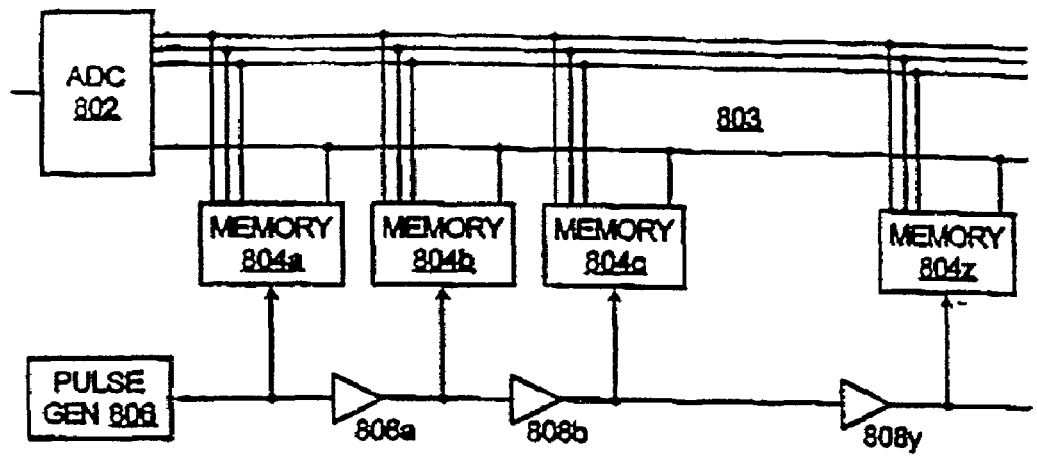
FIG. 10 depicts an alternative embodiment of the present invention for storing sequential information using semiconductor circuits, in which sequential enablement of different memory arrays is controlled by a chain of delay elements.
Figure 10B:
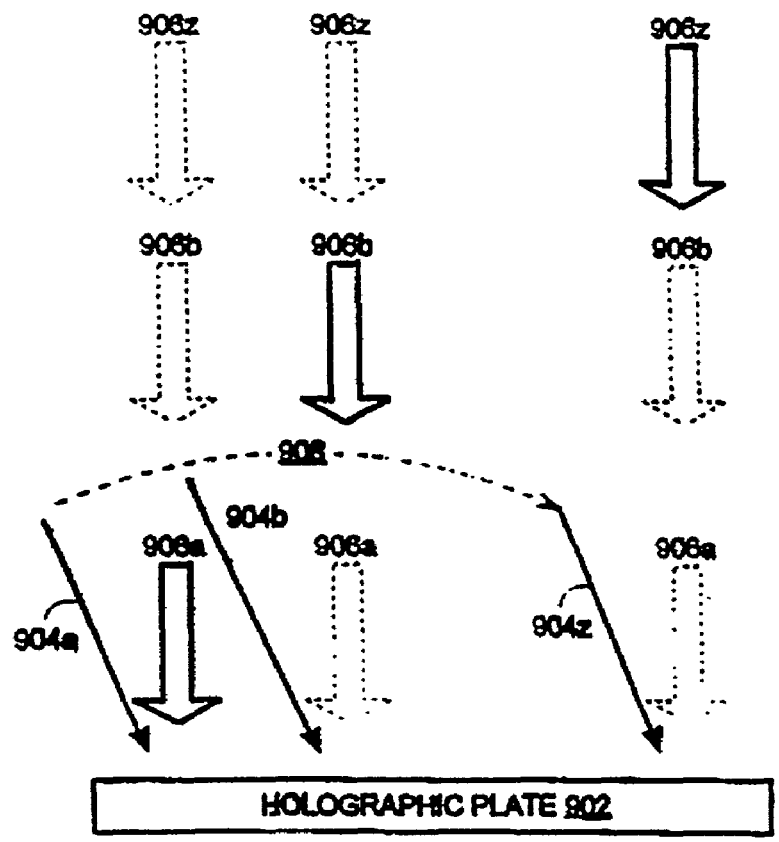

FIG. 10A shows an alternative embodiment of the invention for storing sequential information using semiconductor circuits, in which sequential enablement of different memory arrays is controlled by a chain of delay elements. When the temporally sequential information is in analog form, an analog incoming signal is applied to an analog-to-digital converter 802 to digitize the incoming signal into one or more bits that represent the temporally sequential information. The digitized bits are applied in parallel to a data bus 803 comprising parallel lines that correspond to each bit. Alternatively, if the temporally sequential information is already in digital form, then the analog-to-digital converter 802 may be omitted and the digital temporally sequential information is placed directly on the data bus 803. The number of parallel lines will depend on the precision desired for the implementation, e.g. 8-bit data, 16-bit data, or 32-bit data, or conceivably much larger.

Each line of the data bus 803 is coupled to a corresponding input of semiconductor memory devices in different arrays 804a, 804b, 804c, . . . , 804z. As the digitized temporally sequential information placed on the data bus 803 varies over time, the data bus 803 simultaneously presents the time-varying information to the semiconductor memory devices in arrays 804a, 804b, 804c, . . . , 804z, which device can be a latch, a register, a static random-access memory (SRAM), a dynamic random-access memory (DRAM), a flash electrically erasable programmable read-only-memory (FLASH EEPROM), neural network, or other such memory. Each semiconductor memory device in arrays 804a, 804b, 804c, . . . , 804z is configured to latch or otherwise store the data presented at its input in response to an electrical signal such as a clock signal or an enable signal being applied to its control input.

The signal to control the semiconductor memory devices in 804a, 804b, 804c, 804z is ultimately produced by a pulse generator 808, which is configured to generate a pulse of a prespecified duration, e.g. 100 ns, and apply the pulse to a chain of serially coupled delay elements 808a, 808b, . . . 808y, such as an inverter chain. Furthermore, control inputs of the semiconductor memory devices in arrays 804a, 804b, 804c, . . . , 804z are coupled to an input or output of corresponding delay elements 808a, 808b, . . . , 808y. As the pulse generated by the pulse generator 806 travels down the chain of serially coupled delay elements 808a, 808b, . . . 808y, the pulse is successively delayed and applied to the control inputs of adjacent semiconductor memory arrays 804a, 804b, 804c, . . . , 804z in a temporal sequence, thereby triggering the corresponding semiconductor memory devices in each array, 804a, 804b, 804c, . . . , 804z to store the temporally sequential information at successive points in time.

At each successive point in time, only one of the semiconductor memory arrays 804a, 804b, 804c, . . . , 804z is activated to store the information on the data bus 803 in response to the pulse traveling down the chain of serially coupled delay elements 808a, 808b, . . . 808y. Likewise, the stored temporally sequential information can be replayed by sending another pulse to a delay line to produce successive control signals that direct the semiconductor memory devices 804a, 804b, 804c, . . . , 804z to output their data in sequence.

FIG. 10B depicts another alternative embodiment of the present invention that is implemented with holography. In this embodiment, a holographic plate 902 is provided for storing temporally sequential information on adjacent portions thereof, all of which are illuminated by corresponding object beams 908a, 908b, . . . , 908z that optically encode to the information to be stored. The object beam encapsulates a time-varying wave front bearing the temporally sequential information to be stored.

To store the temporally sequential information at a particular portion of the holographic place 902, a reference beam at position 904a is moved along path 908 to various positions, including position 904z. As the object beams 908a, 908b, . . . , 908z interact with the reference beam at corresponding positions 904a, 904b, . . . , 904z, the beams produce an interference pattern that is recorded on the holographic plate. Although portions of the holographic are illuminated by the object beam 908a, 908b, . . . , 908z, only that portion of the holographic receiving the reference beam at the corresponding positions 904a, 904b, . . . , 904z is activated to store the time-varying information.

The reference beam can be moved by moving the emitter of the reference beam, rotating emitter of the reference beam and projecting the beam into a parabolic mirror, or by successively enabling a set of reference beam emitters disposed in a line. The stored temporally sequential information can be replayed in the same sequence by moving the reference along the same path 908 to produce successive holograms in the same sequence as they were stored.

In alternative embodiments, the principles of the invention described herein may be applied to other forms of memories having fixed memory storage devices that can be subject to successive activation for storing or retrieving information, such as magnetic media (e.g. hard disks and floppy disks) and other forms of optical media (e.g. CDROM).

Thus, the invention confers a major advantage to sequential memory storing and retrieving devices by saving the central processor from having to encode, read and interpret temporal information, thereby freeing significant storage and temporal resources in an instrument.

Whereas particular embodiments of this invention have been described above for purposes of illustration, it will be evident to those persons skilled in the art that numerous variations of the details of the present invention may be made without departing from the invention as defined in the appended claims.

All of the references cited herein are incorporated by reference in their entirety.

REFERENCES

Buzsaki, G., & Chrobak, J. J. (1995). Temporal structure in spatially organized neuronal ensembles: a role for interneuronal networks. *Current Opinion in Neurobiology*, 5, 504-510.

Churchland, P. & Sejnowski, T. (1992). The computational brain. MIT Press, Cambridge, Mass.

Gabor, D. (1992). Holography, 1948-1991. *Science*, 199, 299-313.

Gray C. M., & Singer W. (1989). Stimulus-specific neuronal oscillations in orientation columns of cat visual cortex. *Proc. Natl. Acad. Sci.* (*USA*) 86, 1698-1702.

Kristan, W. B. Jr. (1998). He's got rhythm: single neurons signal timing on a scale of seconds. *Nature Neuroscience*, 1, 843-845.

Landfield, P. W. (1976). Synchronous EEG rhythms: their nature and their possible functions in memory, information transmission and behavior. In: W. H. Gispen (Ed.), *Molecular and Functional Neurobiology* (pp. 390-424) Amsterdam: Elsevier.

Landfield, P. W. (1977). Different effects of post-trial driving or blocking of the theta rhythm on avoidance learning in rats. *Physiology & Behavior*, 18, 439-445.

Landfield, P. W. (1988). Hippocampal neurobiological mechanisms of age-related memory dysfunction. *Neurobiology of Aging*, 9, 591-599.

Landfield, P. W., McGaugh, J. L. & Tusa, R. J. (1972) Theta rhythm: a temporal correlate of memory storage processes in the rat. *Science*, 195, 89-89.

McNaughton, B. L. (1998). The neurophysiology of reminiscence. *Neurobiology of Learning and Memory,* 90, 252-289.

Shadlen, M. N., & Newsome, W. T. (1998). The variable discharge of cortical neurons: implications for connectivity, computation, and information encoding. *The Journal of Neuroscience,* 18, 3890-3898.

Yeckel, M. F., & Berger, T. W. (1998). Spatial distribution of potentiated synapses in hippocampus: dependence on cellular mechanisms and network properties. *The Journal of Neuroscience,* 18, 438-450.

What is claimed is:

1. A memory matrix device for storing temporally sequential information in a manner that retains the sequence of information without dependence on multiple memory addresses, and is not a serial sequential access memory, a random access memory or a dynamic random access memory, comprising:

sequentially-connected arrays of fixed memory storage units;

means for applying the temporally sequential information to the arrays of fixed memory storage units; and means for successively latching and disabling each successive fixed memory storage unit in a sequentially-connected array of said units, each array becoming enabled and then unenabled in temporal sequence, thereby directing the next temporal bit of information to the next memory storage unit in said sequentially-connected array, and wherein, the input to the sequentially-connected array of fixed memory storage units is disabled upon completion of storage of a temporally sequential event to prevent overwriting.

2. A memory matrix device for storing temporally sequential information in a manner that retains the sequence of information without dependence on multiple memory addresses, and is not a serial sequential access memory, a random access memory or a dynamic random access memory, comprising:

sequentially-connected arrays of fixed memory storage units;

means for applying the temporally sequential information to the arrays of fixed memory storage units; and means for successively latching and disabling each successive fixed memory storage unit in a sequentially-connected array of said units, each array becoming enabled and then unenabled in temporal sequence, thereby directing the next temporal bit of information to the next memory storage unit in said sequentially-connected array, wherein the temporally sequential information is applied along parallel inputs to multiple parallel sequentially-connected-arrays of fixed memory storage units, such that fixed memory storage unit of a given sequential order of one said array will store information originating at the same point in time, as information stored in a similar unit of the sequential order on a separate parallel array of said units.

3. The memory matrix device according to claim 1, wherein the array of fixed memory storage units includes semiconductor memory devices.

4. A memory matrix device for storing temporally sequential information in a manner that retains the sequence of information without dependence on multiple memory addresses, and is not a serial sequential access memory, a random access memory or a dynamic random access memory, comprising:

sequentially-connected arrays of fixed memory storage units;

means for applying the temporally sequential information to the arrays of fixed memory storage units; and means for successively latching and disabling each successive fixed memory storage unit in a sequentially-connected array of said units, each array becoming enabled and then unenabled in temporal sequence, thereby directing the next temporal bit of information to the next memory storage unit in said sequentially-connected array, and wherein, the input to the sequentially-connected array of fixed memory storage units is disabled upon completion of storage of a temporally sequential event to prevent overwriting;

wherein the array of fixed memory storage units includes semiconductor memory devices and means for successively latching each fixed memory storage unit of a sequentially-connected array as each fixed memory storage unit in turn becomes enabled and then unenabled, includes a pulse generator whose frequency is synchronized to the frequency of information inputted to the first semiconductor device, and which pulse generator simultaneously latches all fixed memory storage units of the same sequential order in all parallel sequentially-connected arrays, through connections that are functionally perpendicular to those of the sequentially-connected arrays.

5. The memory device according to claim 1, wherein the array of fixed interconnected memory storage units includes portions of a holographic recording medium.

6. The memory device according to claim 5, wherein:

said means for applying includes means for applying an information-containing holographic beam through separate holographic emitters or other means to multiple portions of the holographic recording medium; and said means for successively activating includes a clock element or delaying device for rapidly moving or applying a reference beam from a first of the portions of the holographic recording medium to a second of the portions of the holographic recording medium, such that temporally sequential variations of the said holographic beam are recorded successively in portions.

7. A memory matrix device for storing temporally sequential information in a manner that retains the sequence of information without dependence on multiple memory addresses, and is not a serial sequential access memory, a random access memory or a dynamic random access memory, comprising:

sequentially-connected arrays of fixed memory storage units;

means for applying the temporally sequential information to the arrays of fixed memory storage units; and means for successively latching and disabling each successive fixed memory storage unit in a sequentially-connected array of said units, each array becoming enabled and then unenabled in temporal sequence, thereby directing the next temporal bit of information to the next memory storage unit in said sequentially-connected array, and further comprising:

using the fixed sequentially-connected arrays as a means for subsequently reading each of the fixed memory storage units in a sequentially-connected array, or in multiple parallel sequentially-connected arrays, in the same temporal sequence in which each fixed memory storage unit was initially latched during storage, allowing retrieval of the temporal sequence of stored information without reliance on processing multiple memory addresses.

8. The memory matrix device according to claim 7, wherein the arrays of fixed memory storage units include semiconductor memory devices.

9. The memory device according to claim 7, wherein the array of fixed memory storage units includes portions of a holographic recording medium.

10. The memory device according to claim 1, wherein the array of fixed memory storage units includes magnetic media.

11. The memory device according to claim 7, wherein the array of fixed memory storage units including magnetic media.

12. A memory matrix device for retrieving temporally sequential information, without processing multiple memory addresses, comprising:
    means for activating a pulse generator or other signal generator to read previously-stored information in sequentially-connected arrays of fixed memory storage units in the sequential order in which said fixed memory storage units are connected;
    means for generating signals transmitted through vertical arrays connecting multiple parallel sequentially-connected arrays (horizontal arrays), to allow simultaneous signal application to temporally corresponding fixed memory storage units and consequent reading of information originating at the same point in time in different parallel horizontal arrays; and
    means for successively reading the fixed memory storage units in the same sequence order in which they were latched during storage, to allow retrieval and temporal recreation of the corresponding stored temporally sequential information,
    wherein said pulse generator or other signal generator has a frequency which is synchronized to the frequency of retrieved information, and
    wherein, said pulse generator or other signal generator simultaneously reads all fixed memory storage units of the same sequential order in all parallel sequentially-connected arrays, through connections that are functionally perpendicular to those of the sequentially-connected arrays.

13. A method of storing temporally sequential information in an array of sequentially-connected fixed memory storage units, comprising the steps of:
    applying the temporally sequential information to said sequentially-connected arrays of fixed memory storage units; and
    successively storing bits of temporally sequential information in each of the fixed memory storage units in a sequence based on the order of connection of said fixed memory storage units,
    wherein the arrays of fixed memory storage units includes semiconductor memory devices and
    wherein:
    the fixed memory storage units are connected in a permanent order such that whenever information is applied to the input and first fixed memory storage unit of a sequentially-connected array, the fixed memory storage units of said array are written to and latched in an invariant order; and
    whenever a signal generator activates reading at the first fixed memory storage unit of the array, reading of the entire array of fixed memory storage units occurs in the same invariant order.

14. The method according to claim 13, wherein the step of applying includes the step of applying the temporally sequential information to the arrays of fixed memory storage units in parallel lines or waves.

15. The method according to claim 13, wherein the array of fixed memory storage units includes portions of a holographic recording medium.

16. The method according to claim 13, wherein:
    the step of applying the temporally sequential information to the array of fixed memory storage units includes the step of applying a temporally varying holographic beam to the multiple portions of the holographic recording medium; and
    the step of successively activating each of the fixed memory storage units or arrays of said units in sequence includes the step of moving or applying a reference beam to a first of the portions of the holographic recording medium and then to a second of the portions of the holographic recording medium.

* * * * *